(12) United States Patent
Sohl et al.

(10) Patent No.: US 7,735,706 B2
(45) Date of Patent: Jun. 15, 2010

(54) APPARATUS FOR THE CONNECTION OF STRIPS

(75) Inventors: Ralf-Hartmut Sohl, Solingen (DE); Peter de Kock, Oberhausen (DE); Michael Tomzig, Hattersheim (DE)

(73) Assignee: SMS Siemag Aktiengesellschaft, Düsseldorf (DE)

( * ) Notice: Subject to any disclaimer, the term of this patent is extended or adjusted under 35 U.S.C. 154(b) by 0 days.

(21) Appl. No.: 12/226,640

(22) PCT Filed: Apr. 20, 2007

(86) PCT No.: PCT/EP2007/003456
§ 371 (c)(1),
(2), (4) Date: Oct. 24, 2008

(87) PCT Pub. No.: WO2007/124872
PCT Pub. Date: Nov. 8, 2007

(65) Prior Publication Data
US 2009/0084828 A1  Apr. 2, 2009

(30) Foreign Application Priority Data
Apr. 27, 2006 (DE) .................. 10 2006 020 272
Nov. 30, 2006 (DE) .................. 10 2006 056 481

(51) Int. Cl.
*B23K 31/02* (2006.01)
*B23K 37/04* (2006.01)
(52) U.S. Cl. .................. 228/4.1; 228/5.7; 228/44.3; 228/49.4; 228/170; 228/212
(58) Field of Classification Search .................. None
See application file for complete search history.

(56) References Cited

U.S. PATENT DOCUMENTS

| 3,585,344 | A | * | 6/1971 | Heymann et al. | 219/72 |
| 3,593,907 | A | * | 7/1971 | Hahne | 228/5.7 |
| 4,063,061 | A | | 12/1977 | Fujino et al. | |
| 4,363,694 | A | * | 12/1982 | Fay | 156/435 |
| RE31,192 | E | * | 3/1983 | Andreasson | 242/554.5 |
| 4,642,438 | A | * | 2/1987 | Beumer et al. | 219/121.6 |
| 4,672,165 | A | * | 6/1987 | Ishii et al. | 219/97 |
| 4,677,726 | A | * | 7/1987 | Williams | 29/401.1 |
| 4,706,871 | A | | 11/1987 | Kajiwara et al. | |
| 4,851,073 | A | * | 7/1989 | Satou | 156/516 |
| 4,972,987 | A | * | 11/1990 | Di Rosa | 228/4.1 |
| 5,169,051 | A | * | 12/1992 | Noe | 228/5.7 |
| 5,536,915 | A | * | 7/1996 | Peru et al. | 219/121.63 |
| 5,605,275 | A | * | 2/1997 | Rintala | 228/49.4 |
| 5,683,027 | A | * | 11/1997 | Rintala | 228/49.4 |
| 5,742,022 | A | | 4/1998 | Crawford et al. | 219/86.25 |
| 5,878,944 | A | * | 3/1999 | Aebersold et al. | 228/212 |
| 5,931,370 | A | * | 8/1999 | Poloni et al. | 228/158 |

(Continued)

FOREIGN PATENT DOCUMENTS

EP  0 845 309  6/1998

(Continued)

*Primary Examiner*—Kiley Stoner
(74) *Attorney, Agent, or Firm*—Friedrich Kueffner

(57) ABSTRACT

The invention relates to an apparatus and a method for clamping, cutting, and joining strips to a continuous strip. Said device comprises a clamping device (125), a cutting device (155), and a joining device (195). The clamping device, cutting device, and joining device are kinematically coupled to each other.

21 Claims, 9 Drawing Sheets

U.S. PATENT DOCUMENTS

| | | | | |
|---|---|---|---|---|
| 5,932,117 | A * | 8/1999 | Johnson et al. | 219/121.63 |
| 5,979,738 | A * | 11/1999 | Kuchuk-Yatsenko et al. | 228/5.7 |
| 6,013,148 | A * | 1/2000 | Bluemle | 156/159 |
| 6,070,781 | A * | 6/2000 | Johnson et al. | 228/49.4 |
| 6,209,189 | B1 * | 4/2001 | Murata | 29/564.4 |
| 6,419,142 | B1 * | 7/2002 | Larsson | 228/2.1 |
| 6,518,535 | B2 * | 2/2003 | Yoneya et al. | 219/82 |
| 6,572,003 | B2 * | 6/2003 | Miyata et al. | 228/49.1 |
| 7,100,657 | B2 * | 9/2006 | Kataoka et al. | 156/457 |
| 7,320,172 | B1 * | 1/2008 | Kamiya | 29/809 |
| 2001/0042774 | A1 * | 11/2001 | Miyata et al. | 228/171 |
| 2002/0011469 | A1 * | 1/2002 | Miyata et al. | 219/82 |
| 2003/0066861 | A1 * | 4/2003 | Gehde | 228/45 |
| 2005/0035175 | A1 * | 2/2005 | Nakamura et al. | 228/44.3 |
| 2008/0047938 | A1 * | 2/2008 | Rippl | 219/86.24 |
| 2008/0197171 | A1 * | 8/2008 | Frasch et al. | 228/176 |
| 2009/0294418 | A1 * | 12/2009 | Barjon et al. | 219/121.64 |

FOREIGN PATENT DOCUMENTS

| | | | |
|---|---|---|---|
| GB | 909 128 | | 10/1962 |
| JP | 60180689 A | * | 9/1985 |
| WO | WO-8607564 A | * | 12/1986 |

* cited by examiner

APPARATUS FOR THE CONNECTION OF STRIPS

TECHNICAL FIELD

The invention concerns a device and a method for clamping, cutting, and joining strips to form an endless strip.

PRIOR ART

In the processing of metal strip, it is advantageous if the processing is carried out continuously, since this means that no changing time must be expended for changing the workpieces to be processed in the process. However, if the workpieces are in the form of sheets of finite length, it can be advantageous to join them. By repeating this joining process several times, a so-called "endless strip" can be produced in this way. The endless strip is then processed in a continuous processing train. After it has been processed, the endless strip is typically cut into individual strips again.

In the prior art, devices for joining methods of this type are very complicated or they do not have the necessary joining precision. The operation of the devices is also very complicated. Another especially important problem with these devices is that the edges of the sheets to be joined are not parallel to each other, or the joint is not at least essentially flat.

U.S. Pat. No. 4,063,061 discloses a welding device for welding strips.

DESCRIPTION OF THE INVENTION, OBJECTIVES, SOLUTION, AND ADVANTAGES

Therefore, the objective of the invention is to create a device and a method with which an endless strip can be produced from sheet strips simply, quickly, and with high quality.

In accordance with the invention, the objective with respect to a device is achieved with a device for clamping, cutting and joining strips to form an endless strip with a clamping arrangement, a cutting arrangement and a joining arrangement, wherein the clamping, cutting, and joining arrangements are kinematically coupled with one another.

In this connection, it is advantageous if the clamping arrangement comprises an upper strip clamp and a lower strip clamp, which can be moved toward or away from each other by levers in order to clamp or release the strips.

In this regard, it is especially advantageous if the cutting arrangement comprises an upper cutting blade and a lower cutting blade, such that the lower cutting blade can be moved in or out under the control of levers. In accordance with an advantageous embodiment, the lower cutting blades can be lowered. In this connection, in at least one embodiment, it is advantageous if the cutting arrangement comprises upper and lower cutting blades, wherein the upper cutting blades can be driven or moved or acted upon from above in the direction of the lower cutting blades to make the cut.

In accordance with another advantageous aspect of the invention, after the cut has been made, the cut strips are moved toward each other by lateral displacement of the one or more clamping arrangements. In this regard, if two opposing clamping arrangements are present, it can be advantageous if only one or both clamping arrangements can be laterally displaced.

It is advantageous if the joining arrangement comprises a welding arrangement with a welding table.

In accordance with another advantageous aspect of the invention, a welding table can be moved to the unsupported end of the strip to support it. In this regard, it is advantageous if the welding table is constructed in two or more parts. It is also advantageous if the welding table can be shifted and swiveled by levers and actuating elements, such as hydraulic cylinders.

In this connection, it is especially advantageous if the welding table is supported in a plurality of places, as viewed over the width of the strip or strips, on the lower cutting blade(s) by means of levers.

It is especially effective if the lowering function of the lower cutting blades can be used for clamping the strip by virtue of the welding table acting on the strip.

It is also effective if the device is constructed essentially symmetrically and has two clamping arrangements, two cutting arrangements, and two joining arrangements. It is advantageous for these to be positioned opposite each other with mirror symmetry.

Furthermore, it is effective if at least one of the clamping arrangements has a device for height adjustment. It is especially advantageous if both clamping arrangements have a height adjustment device of this type, so that a height adjustment can be made on either side.

It is advantageous if the device for height adjustment has an eccentric adjustment mechanism.

In accordance with the invention, the objective with respect to a method is achieved with a method for operating a device for clamping, cutting, and joining strips to form an endless strip with at least two clamping arrangements, a cutting arrangement and a joining arrangement, where, in a first step, the clamping arrangements of the device are opened to allow the ends of two strips to be inserted. In this regard, it is advantageous if, in a next step, the ends of the strips are clamped by the clamping arrangements. Furthermore, it is advantageous if, after the cutting operation, in a next step, the ends of the strips are cut by a cutting arrangement or cutting arrangements, and if the cut ends of the strips are then repositioned in a next step. In addition, it is advantageous if, after the cutting process, in a further step, the cut ends of the strips are supported by a welding table, which is advantageously constructed in several parts, e.g., two parts, and, in another step, a height adjustment of the two cut ends of the strips is carried out, so that thickness differences of the strips that are to be joined can be compensated, before, in a next step, the ends of the strips are joined. It is also advantageous if, in a next step, the clamping arrangement releases the joined strip again.

Advantageous modifications are described in the dependent claims.

BRIEF DESCRIPTION OF THE DRAWINGS

The invention is explained in greater detail below on the basis of a specific embodiment illustrated in the drawings.

PREFERRED EMBODIMENT OF THE INVENTION

The device of the invention and the steps of the method for joining the individual strips are described below with reference to the drawings, in which parts that are the same are denoted by the same reference symbols. It should also be noted that elements of the device on the right side are denoted by -r and on the left side by -l.

Figure 1:
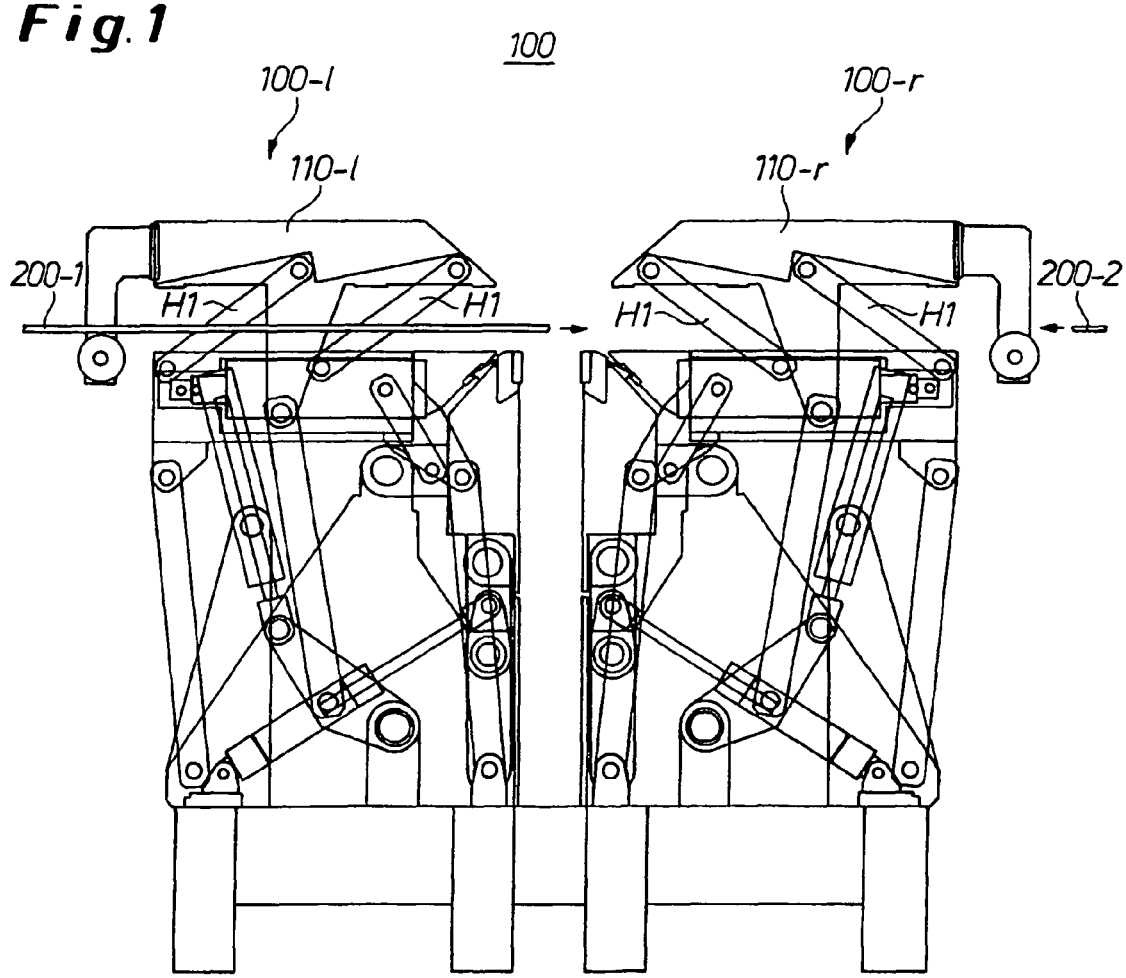
FIG. 1 is a schematic drawing of a device of the invention for joining strips.

FIG. 1 shows the device 100 of the invention, which comprises a right part 100-*r* and a left part 100-*l*. The two parts of the device are constructed essentially with mirror symmetry, and each is capable of handling one of the individual strips that are to be joined with each other. Accordingly, a first individual strip 200-1 is fed or inserted from the left into the left part 100-*l* of the device 100, and a second individual strip 200-2 is fed or inserted from the right into the right part 100-*r* of the device 100.

To allow the strips 200-1, 200-2 to be inserted, the upper strip clamps 110-*l*, 110-*r* are swiveled upward into an open position by means of levers H1 arranged in the manner of a parallelogram.

In this regard, both the right part 100-*r* and the left part 100-*l* of the device 100 have strip clamps 110, which can be opened and closed to grip and hold the strip and the individual strip 200-1, 200-2. Each of the strip clamps 110 consists of two strip clamps 110-*r*, 110-*l* and 120-*r*, 120-*l* that can be moved relative to each other. In this regard, each upper strip clamp 110-*r* and 110-*l* cooperates with the corresponding lower strip clamp 120-*r* and 120-*l*. The upper strip clamp can be swiveled under the control of the parallelogram levers H1 in such a way that a gap or receiving area for receiving the strip is formed between the upper strip clamp 110 and the lower strip clamp 120. When the gap is closed again by swiveling the upper strip clamp 110 back, the strip is clamped and held by the strip clamps 110, 120. In this regard, at least the upper and the lower strip clamps 110, 120 form a clamping arrangement 125 for clamping a strip.

Figure 2:
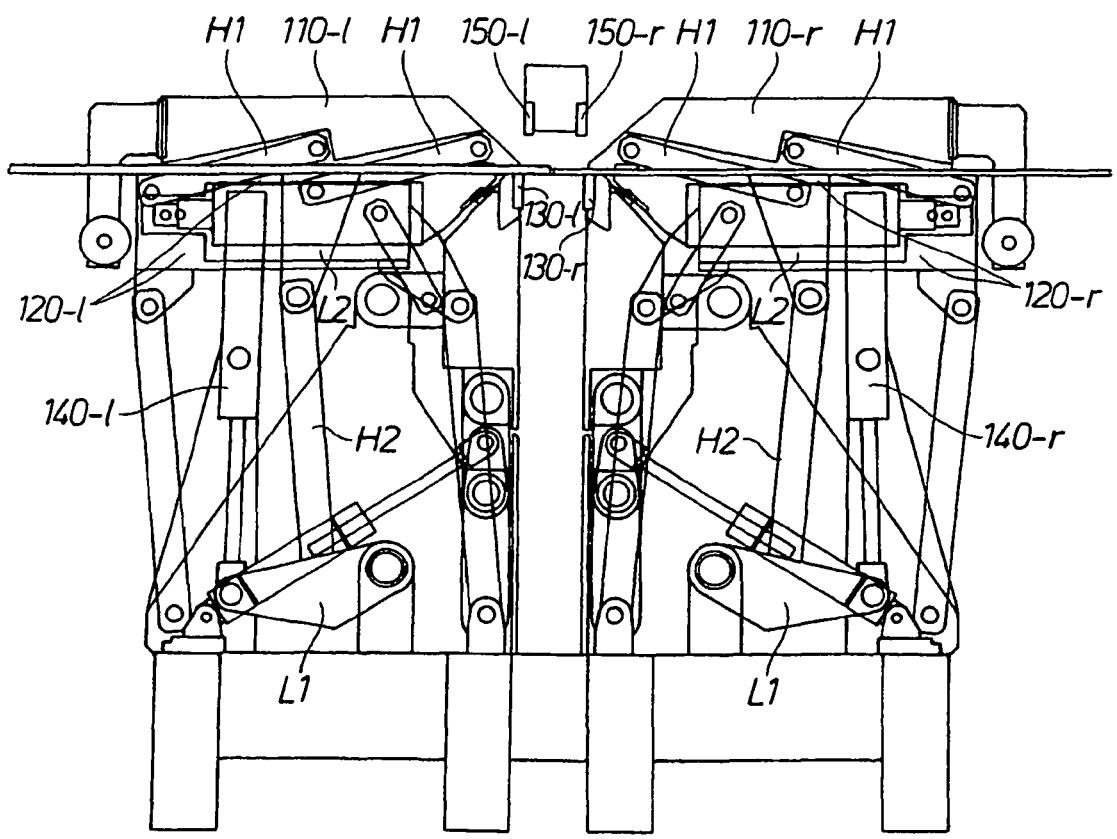
FIG. 2 is a schematic drawing of a device of the invention for joining strips.

As FIG. 2 shows, after the strip clamps 110, 120 have been opened, the two individual strips 200-1 and 200-2, initially entering from the left and right, are pushed together in the center of the device 100, so that they come together and are in contact with each other in the area between the strip clamps. The upper strip clamps 110-*r* and 110-*l* are then lowered into a closed position, in which the two individual strips 100-1 and 200-2 are then securely clamped between the upper strip clamp 110-*r*, 110-*l* and a lower strip clamp 120-*r* and 120-*l*.

The swiveling movement of the upper strip clamps 110-*r* and 110-*l* is controlled by the lever arms H1, and the driving force for the swiveling process is applied, for example, by hydraulic cylinders 140. The opening and closing of the upper strip clamps 110 is effected by hydraulic cylinders 140-*l* and 140-*r* in cooperation with the link plates L1, L2 and the levers H1, H2, where at least the hydraulic cylinders 140 are preferably mounted outside on the device. The link plates L1 are connected at one end with the hydraulic cylinders 140, and at the other end they pivot on the bearing LA1. The levers H2 are pivoted at one end with the link plates L1 and at the other end with the link plates L2. The link plates L2 are in turn connected with the upper strip clamps 110. If the hydraulic piston or ram of the hydraulic cylinder 140 is then raised or extended, the link plate L1 swivels upward, and at the same time lever H2 swivels upward and swivels the link plate L2 and the upper strip clamp 110 upward.

The strips then rest at the same time on the lower blades 130-*l*, 130-*r* in the center region. In the center region between the left and right strip clamps 110-*l*, 110-*r*, upper blades 150-*l*, 150-*r* then fall onto the two strips and cut off their ends in cooperation with the lower blades 130-*l*, 130-*r*. After the cutting operation, each of the two new ends of the strips 200-1, 200-2 then has a clean and straight cut edge, and the two cut edges are then aligned essentially parallel to each other. In this connection, at least the upper and the lower blades 130, 150 form a cutting arrangement 155 for cutting a strip.

Figure 3:
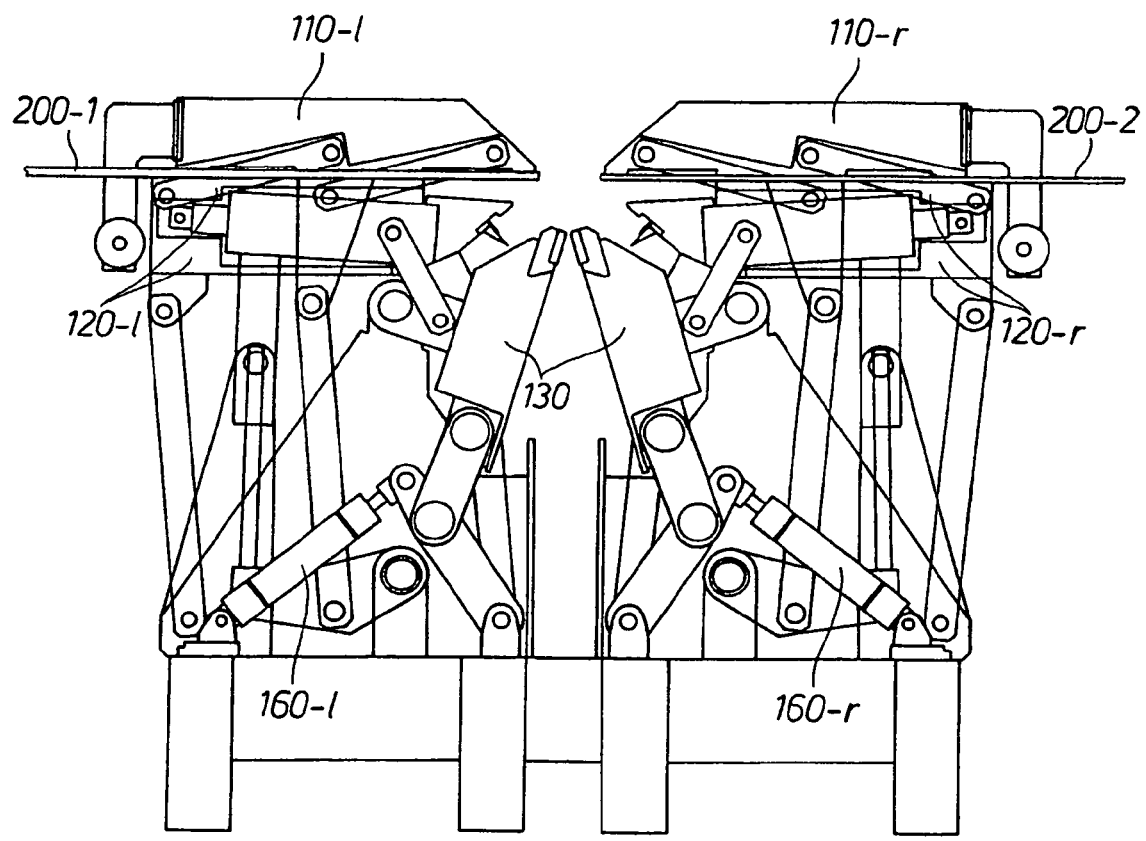
FIG. 3 is a schematic drawing of a device of the invention for joining strips.

As FIG. 3 shows, after the cutting operation, the blade holders 130 with the two lower blades 130-*l*, 130-*r* are swung down and away by means of hydraulic cylinders 160-*l*, 160-*r*. As before the cutting operation, the two strips 200-1 and 200-2 remain clamped between the upper and lower strip clamps 110, 120. It is advantageous if the swinging away of the blade holders 130 with the lower blades 130-*l*, 130-*r* is simultaneously used for clamping the strips.

As is also apparent from FIG. 3, the blade holders 130 also articulate with the hydraulic cylinders 160-*l*, 160-*r* by means of levers 131-*l*, 131-*r*, so that the inclination and thus the position of the blades 130-*l*, 130-*r* are adjusted by controlling the hydraulic piston of the hydraulic cylinder.

Figure 4:
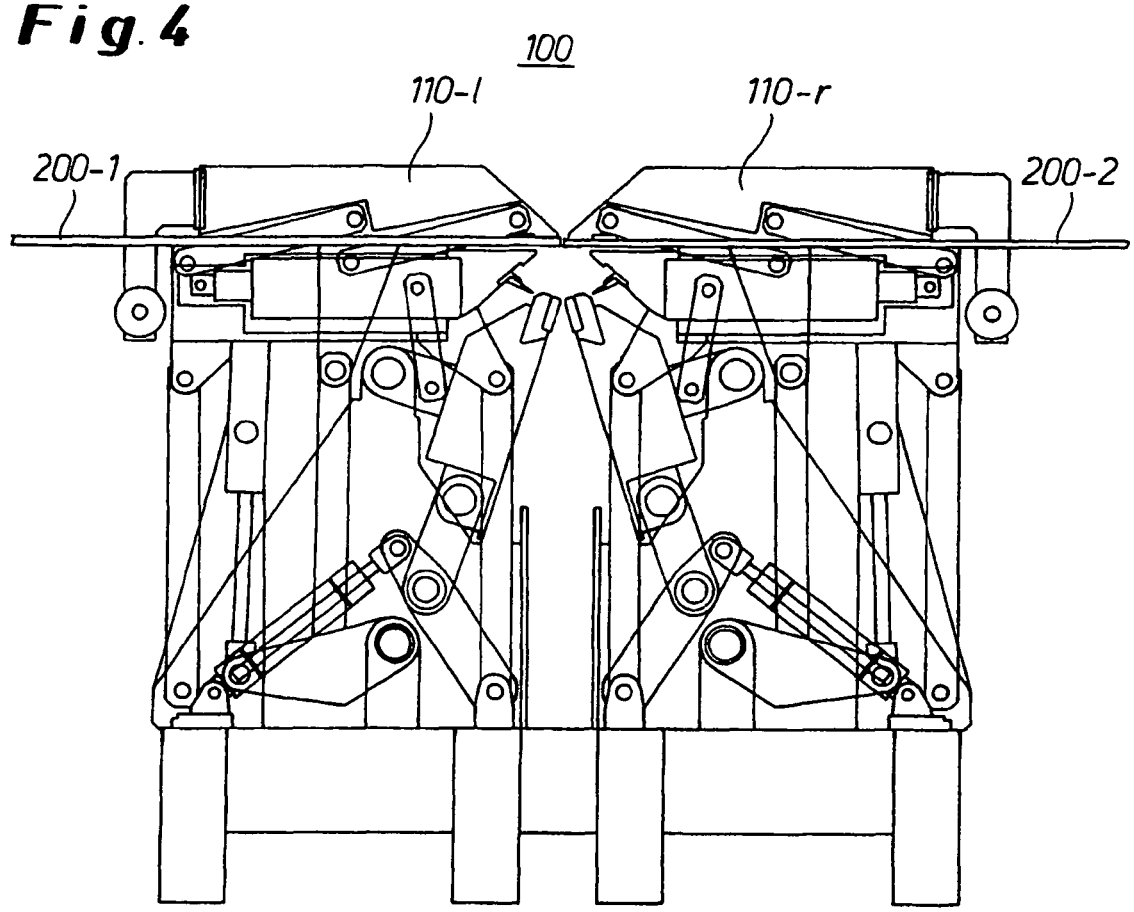
FIG. 4 is a schematic drawing of a device of the invention for joining strips.

FIG. 4 shows that the right and left upper strip clamps 110, 120, together with the still clamped strips 200-1, 200-2, are moved towards each other in the direction of the center of the device 100 in order to bring the two cut ends of the strips together at a joining site F. The ends of the strips are brought together by swiveling the support lever arms THA, which support the strip clamps. However, after the ends of the strips have been brought together, the strips 200-1, 200-2 at first are no longer supported at the joining site F.

Figure 5:
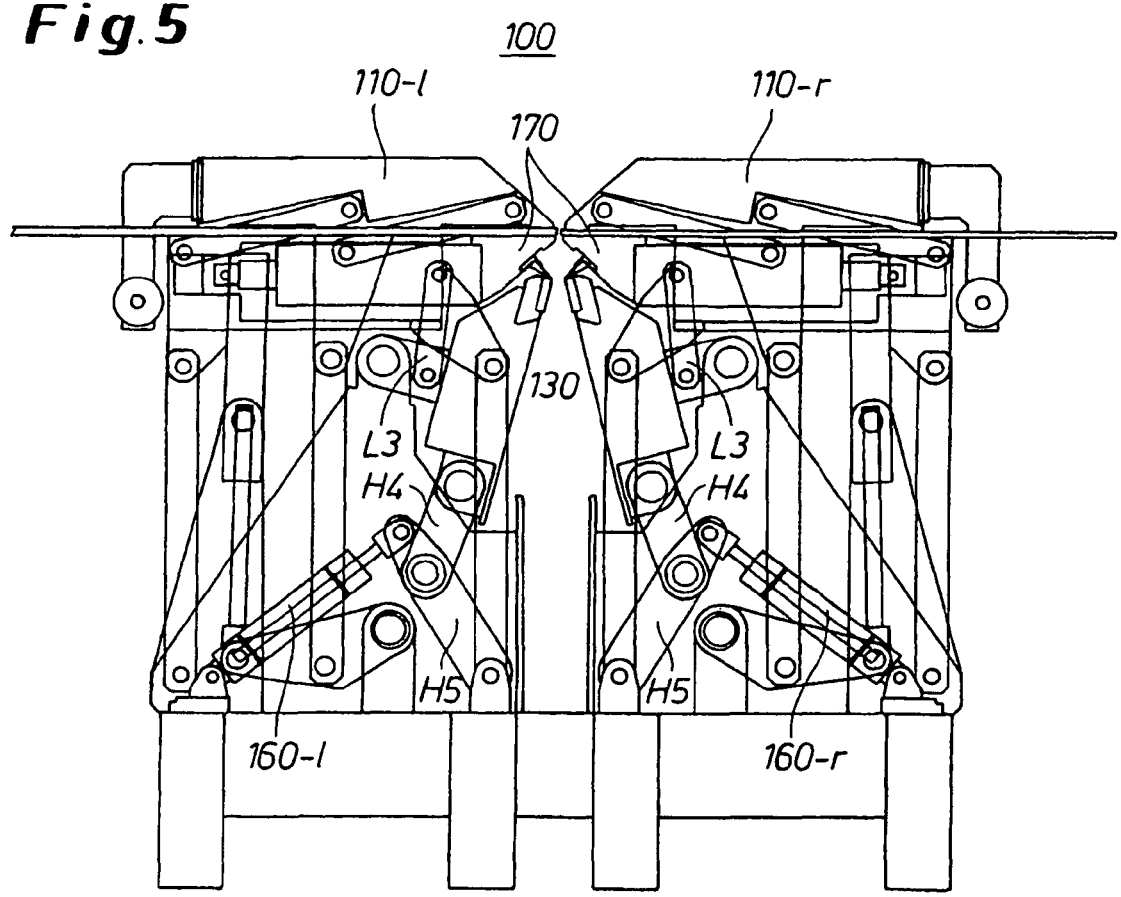
FIG. 5 is a schematic drawing of a device of the invention for joining strips.

As is shown in FIG. 5, to support the strips 200-1, 200-2 at the joining site, a left and a right welding table 170-*l*, 170-*r* are then moved from below against the ends of the strips. The welding tables 170-*l*, 170-*r* are supported on the blade holders 130, which have been swung away, by several link plates L3, which are distributed over the width of the device or the width of the strips. This prevents unacceptable sagging of the welding tables over the width.

According to FIG. 5, the welding tables 170-*l*, 170-*r* are set against the ends of the strips from below by readjusting the blade holders with the lower blades by means of toggles H4, H5 and hydraulic cylinders 160-*l*, 160-*r*, and in this way, the ends of the strips are securely clamped for welding between the upper strip clamp and the welding table. To readjust the blade holders 130, the hydraulic cylinders 160 according to FIG. 5 are drawn up a little more than in FIG. 4.

Figure 6:
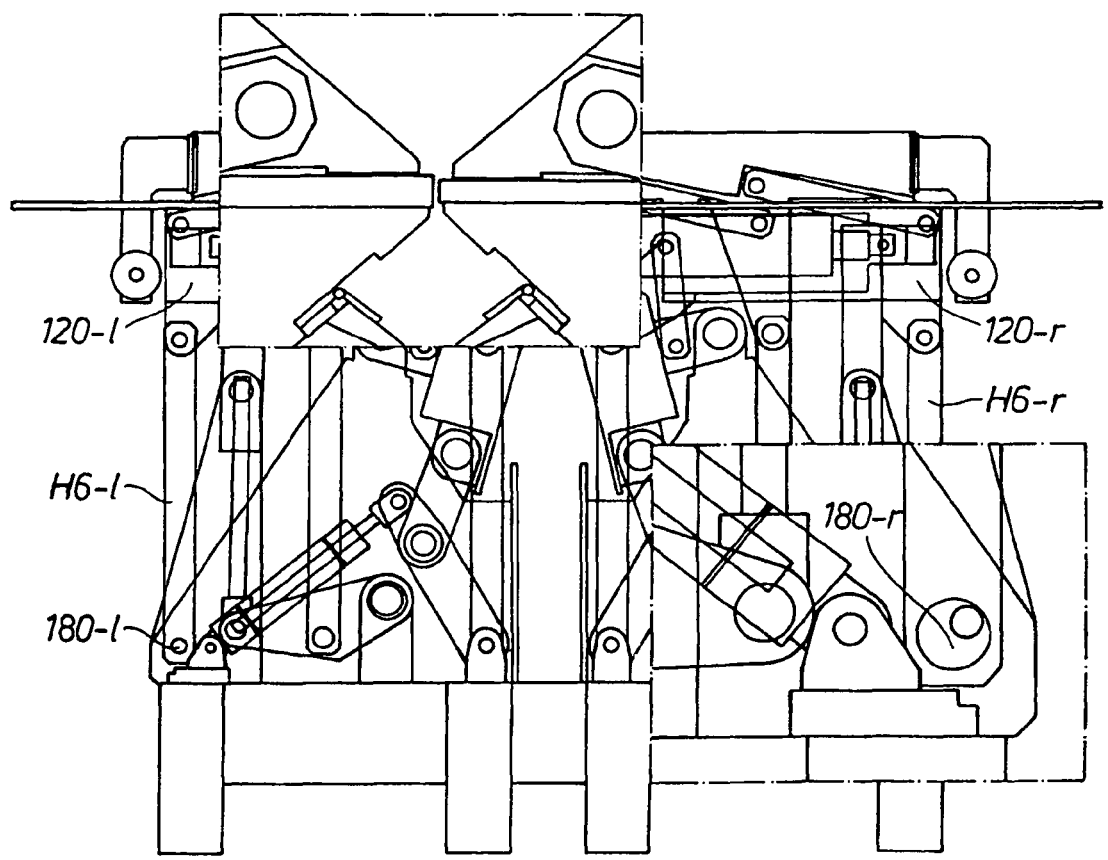
FIG. 6 is a schematic drawing of a device of the invention for joining strips.

According to FIG. 6, before the strip ends are welded, especially when the strips differ in thickness, a height adjustment is made in such a way that the two ends of the strips are positioned centrally in height relative to each other and fixed in place; in other words, the strips are joined in a neutral axis. The relative position of the ends of the strips that has been adjusted in this way represents the actual welding position. The height adjustment is made by means of an eccentric mechanism, which comprises an eccentric 180-*r*, 180-*l* and a lever H6-*r*, H6-*l*, which connects the eccentric with the lower strip clamp 120-*r*, 120-*l*. It is advantageous for an eccentric mechanism to be provided on both sides, i.e., both the left side and the right side. In accordance with the invention, however, the eccentric mechanism can also be installed on one side only.

Figure 7:
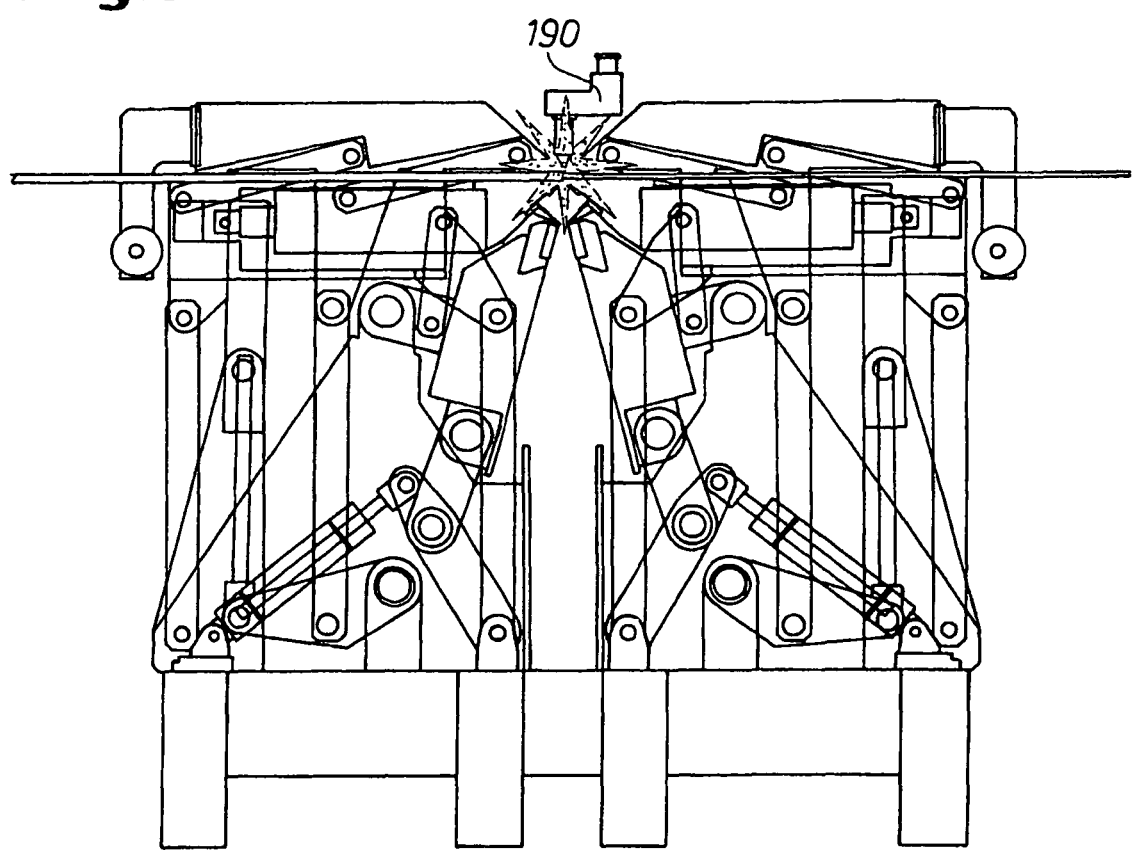
FIG. 7 is a schematic drawing of a device of the invention for joining strips.

In the welding position, the ends of the strips are then joined by a joining arrangement 195. It can be advantageous, as shown in FIG. 7, for the joining arrangement to be a welding arrangement 190, which, for example, can be lowered from above the welding position and welds the two ends of the strips together. For this purpose, it is advantageous to lower or position the welding arrangement.

Figure 8:
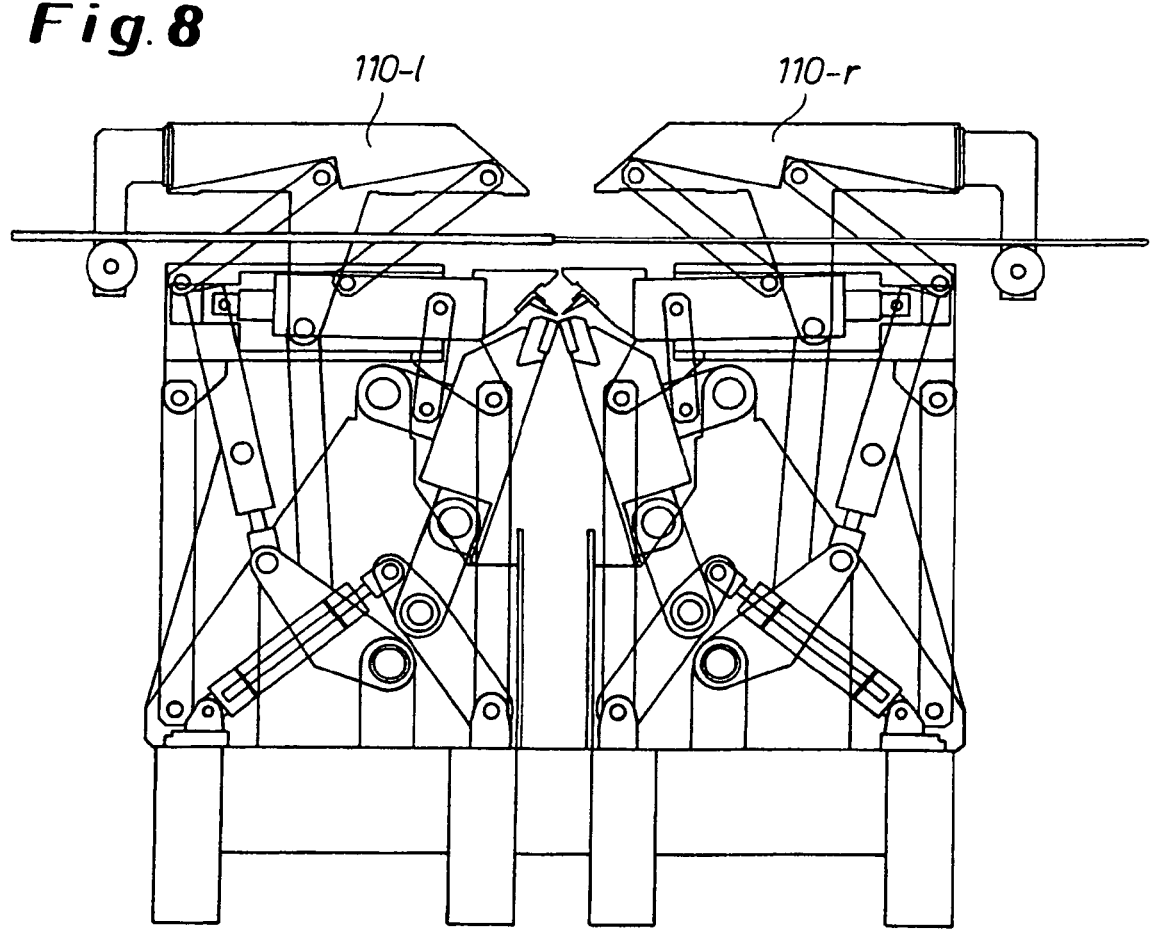
FIG. 8 is a schematic drawing of a device of the invention for joining strips.

As shown in FIG. 8, after the welding operation has been completed, the "endless strip" that has thus been welded together from the two individual strips is released from its clamped position, especially by swinging the two upper strip clamps 110-l, 110-r back up into their open position. The endless strip is then available for continuous processing in a continuous plant.

Figure 9:
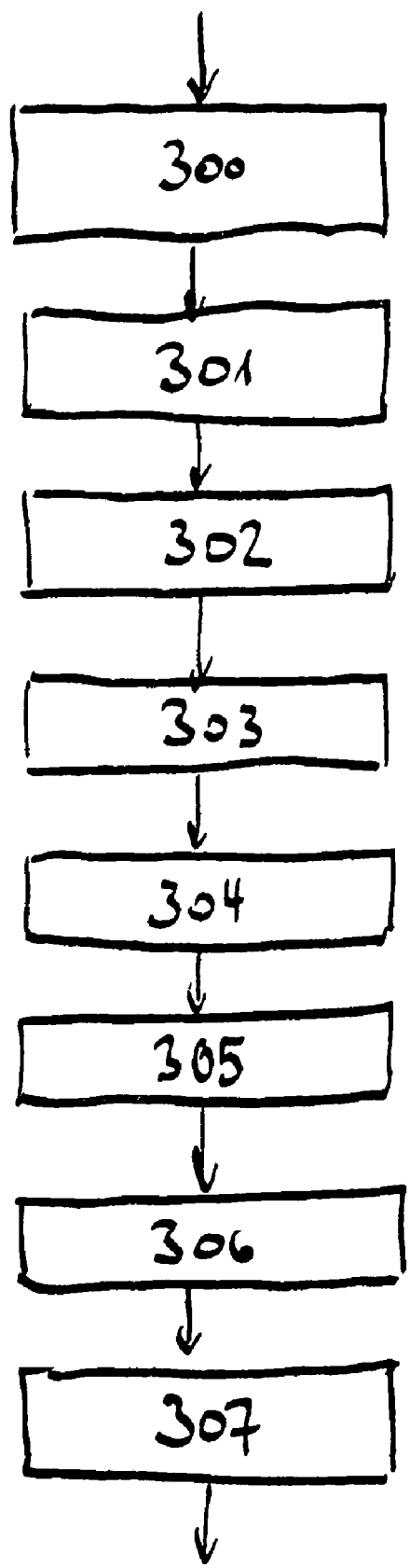
FIG. 9 is a diagram of the sequence of a method in accordance with the invention.

As described above, the device 100 allows a multiple-step process for clamping, cutting, and joining strips to form a so-called endless strip, as is illustrated schematically in the diagram of FIG. 9. In the first step 300, the clamping arrangement 110, 120 of the device 100 is opened to allow two strips to be inserted. In the next step 301, the ends of the strip are then securely clamped, so that in the following step 302, they can be cut. In the next step 303, the cut ends of the strips are repositioned (step 304) and then supported at the joining site (step 305). They are then joined in the next step 306, and in the last step 307, the strip is released again.

It is advantageous for the strip ends to be supported after the welding operation and the repositioning operation by means of a welding table with several parts, e.g., two parts, which is raised from below against the strip in the end region or the strip end.

In addition, before the joining operation is carried out, a height adjustment can also be made, so that differences in the thickness of the strips to be joined can be compensated. This height adjustment is carried out, for example, by means of an eccentric mechanism.

LIST OF REFERENCE SYMBOLS

100 device
100-r, 100-l right and left part of the device
110 upper strip clamp
110-l, 110-r upper strip clamp
120 lower strip clamp
120-l, 120-r lower strip clamp
125 clamping arrangement
130 blade holder for the lower blade
130-l, 130-r lower blade
131-l, 131-r lever
140 hydraulic cylinder
140-l, 140-r hydraulic cylinder
150 upper blade
150-l, 150-r upper blade
155 cutting arrangement
160 hydraulic cylinder
160-l, 160-r hydraulic cylinder
170 welding table
170-l, 170-r welding table
180 eccentric
180-l, 180-r eccentric
190 welding arrangement
195 joining arrangement
200 strip
200-1 individual strip
200-2 individual strip
300 step
301 step
302 step
303 step
304 step
305 step
306 step
307 step
H1 lever
H2 lever
H4 toggle
H5 toggle
H6-r, H6-l lever
L1 link plate
L2 link plate
L3 link plate
LA1 bearing
THA support lever arm
F joining site

The invention claimed is:

1. A device (100) for clamping, cutting, and joining strips to form an endless strip with a clamping arrangement (125), a cutting arrangement (155), and a joining arrangement (195), wherein the clamping, cutting, and joining arrangements (125, 155, 195) are kinematically coupled with one another.

2. A device in accordance with claim 1, wherein the clamping arrangement (125) comprises an upper and a lower strip clamp (110, 120), which can be moved toward or away from each other under the control of levers (H1, H2, L1, L2) in order to clamp or release the strips (200).

3. A device in accordance with claim 1, wherein the cutting arrangement (155) comprises upper and lower cutting blades (130-l, 130-r, 150-l, 150-r), such that the lower cutting blades (130-l, 130-r) can be moved in or out under the control of levers (131).

4. A device in accordance with claim 3, wherein the lower cutting blades (130-l, 130-r) can be lowered.

5. A device in accordance with claim 3, wherein the cutting arrangement (155) comprises upper and lower cutting blades (130-l, 130-r, 150-l, 150-r), where the upper cutting blades (150-l, 150-r) can be driven from above in the direction of the lower cutting blades (130-l, 130-r) to make the cut.

6. A device in accordance with claim 1, wherein, after the cut has been made, the cut ends of the strips are moved toward each other by lateral displacement of the appropriate clamping arrangement (125).

7. A device in accordance with claim 6, wherein, to support the ends of the strips, at least one welding table (170) can be moved to the unsupported ends of the strips.

8. A device in accordance with claim 7, wherein the one or more welding tables (170) are constructed in two or more parts.

9. A device in accordance with claim 7, wherein the welding table (170) is supported in a plurality of places, as viewed over the width of the strip or strips, on the lower cutting blades (130) by means of levers (L3).

10. A device in accordance with claim 7, wherein the lowering function of the lower cutting blades (130) can be used for clamping the strip.

11. A device in accordance with claim 1, wherein the device (100) is constructed essentially symmetrically and has two clamping arrangements (125), two cutting arrangements (155), and at least one or two joining arrangements (195).

12. A device in accordance with claim 11, wherein at least one of the clamping arrangements (125) has a device for height adjustment.

13. A device in accordance with claim 12, wherein the device for height adjustment has an eccentric adjustment mechanism.

14. A method for operating a device (100) for clamping, cutting, and joining strips to form an endless strip with at least two clamping arrangements (125), a cutting arrangement (155) and a joining arrangement (195), in accordance with claim 1, wherein in a first step, the clamping arrangements (125) of the device (100) are opened to allow the ends of two strips to be inserted.

15. A method in accordance with claim 14, wherein, in a next step, the ends of the strips are clamped by the clamping arrangements (125).

16. A method in accordance with claim 15, wherein, in a next step, the ends of the strips are cut by at least one cutting arrangement (155).

17. A method in accordance with claim 16, wherein, in a next step, the cut ends of the strips are repositioned.

18. A method in accordance with claim 16, wherein, after the cutting operation, in a next step, the cut ends of the strips are supported by at least one welding table (170), which is constructed in several parts, e.g., two parts.

19. A method in accordance with claim 16, wherein, in a next step, a height adjustment of the two cut ends of the strips is carried out, so that thickness differences of the strips that are to be joined can be compensated.

20. A method in accordance with claim 16, wherein, in a next step, the ends of the strips are joined.

21. A method in accordance with claim 20, wherein, in a next step, the clamping arrangement (125) releases the joined strip again.

\* \* \* \* \*